J. C. DOWD.
SELF LUBRICATED SPRING FOR VEHICLES.
APPLICATION FILED APR. 26, 1916.
1,257,197.
Patented Feb. 19, 1918.
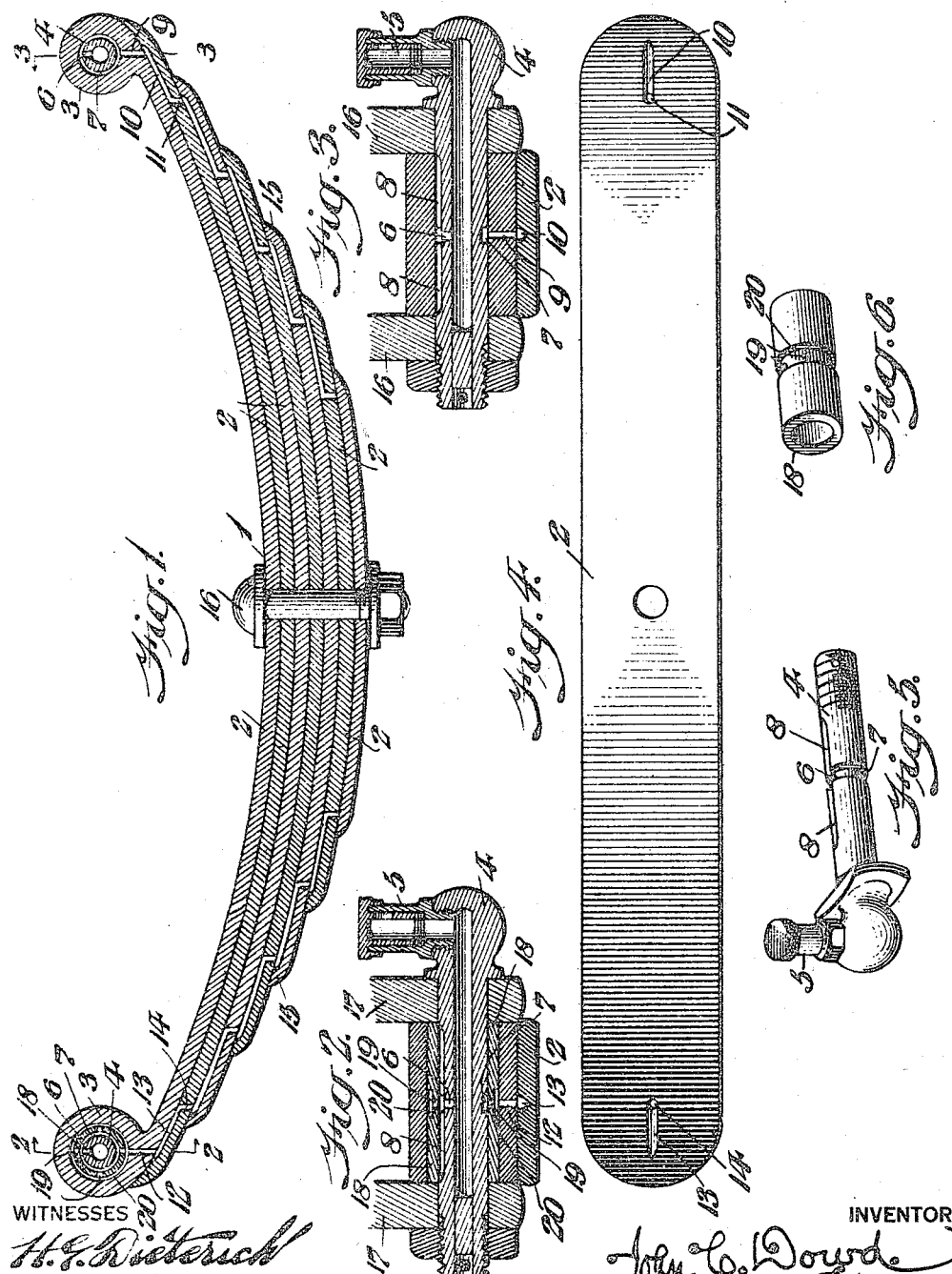

UNITED STATES PATENT OFFICE.

JOHN C. DOWD, OF MERCHANTVILLE, NEW JERSEY.

SELF-LUBRICATED SPRING FOR VEHICLES.

1,257,197.  Specification of Letters Patent.  Patented Feb. 19, 1918.

Application filed April 26, 1916. Serial No. 93,613.

*To all whom it may concern:*

Be it known that I, JOHN C. DOWD, a citizen of the United States, residing at Merchantville, in the county of Camden, State of New Jersey, have invented a new and useful Self-Lubricated Spring for Vehicles, of which the following is a specification.

My invention consists of a spring for a vehicle, the same having its leaves adapted to be lubricated to ease the motions thereof, the supply of the oil or lubricant being directed from the bolts employed to carry the ends of the spring, said bolts being utilized as primary chambers or reservoirs for the oil or lubricant. As the spring is of the kind employed to oscillate, or rise and fall particuarly at one end, with its coupling members on other portions of the vehicle, a bushing or sleeve is interposed between the ends of the spring and the chambered bolts therein, the same being adapted to allow the oil or lubricant to flow therethrough in its passage to the leaves and reduce the friction of the contacting parts and easing the oscillations of the end of the spring, as will be hereinafter set forth.

The invention is satisfactorily illustrated in the accompanying drawing, but the important instrumentalities thereof may be varied, as long as they are included in the scope of the claims.

Figure 1 represents a longitudinal section of a spring embodying my invention.

Fig. 2 represents a transverse section thereof on line 2—2 Fig. 1.

Fig. 3 represents a transverse section on line 3—3 Fig. 1.

Fig. 4 represents a plan view of one of the leaves of the spring.

Fig. 5 represents a perspective view of one of the chambered bolts employed.

Fig. 6 represents a perspective view of a bushing employed.

Similar numerals of reference indicate corresponding parts in the figures.

Referring to the drawings, 1 designates the top plate or leaf of a spring, and 2 designates loose leaves thereof of the spring in the present case being of the type of an elliptical spring, to which type, however, I do not limit my invention.

On the ends of said plate are the ears 3 which are adapted to receive the attaching bolts 4, or the bolts which attach the spring to the proper members of a vehicle.

The bolts are tubular and have connected with them at their outer ends, the cups 5 which are adapted to receive oil or lubricant for the leaves of the spring, said oil or lubricant being adapted to enter the bore of said bolts as distributing chambers therefor.

Through the wall of each bolt is the outlet duct 6 which is in communication with the bore or chamber of the bolt.

Extending circumferentially around the exterior of each bolt is the groove 7, and extending in the longitudinal direction of each bolt are the longitudinally-extending grooves 8, said grooves 8 and 7 being in communication with the duct 6.

In the right hand end of the spring, as shown in Fig. 1, through the underside of the ear 3 thereof, is the outlet duct 9 which is in communication with the longitudinally-extending channel 10, in the upper side of the leaf 2 contiguous to the plate or leaf 1. At the inner terminal of said channel is the duct 11 which passes through said leaf 2. In the left hand end of the spring, through the underside of the ear 3 thereof, is the duct 12 through the same, this being similar to the duct 9, it being noticed that the left hand end of the spring 2 has therein the channel 13, and duct 14, which are similar to the channel 10 and duct 11, in the right hand end of said spring.

It will be noticed that the body of the spring in its entirety is composed of a plurality of springs 15 below the spring 2, the several springs being nested and centrally united by the bolt 16, in any suitable manner, it being evident that oil or lubricant from the bolts 4 will flow therefrom through the port 6, enter the circumferential groove 7, and the longitudinally-extending grooves 8, whereby the oil or lubricant enters the port 9 in the ear 3, and flows therethrough, and so reaches the leaves, when owing to the channels 10 and ports 11, it is distributed between the several leaves and so lubricates the same.

This is the operation at the right hand end of the spring where the latter is held firmly in place by the stationary shackle 16 which carries the bolt 4 as a fixed pivot for the spring at said end, said shackle being held on a proper portion of the running gear of the vehicle not shown, but the left hand end of the spring is intended to oscillate in vertical direction owing to the shackle 17 which carries the bolt 4 being adapted to rise and fall with the coupling of a proper part of other spring mechanism of the vehicle, hence I introduce into the ear at said left hand end, the loose bushing 18 which freely encircles the bolt 4 thereat, the wall of said bushing having therethrough the ports 19 and around said wall the circumferential groove 20 which is in communication with said ports, and so the oil or lubricant from the chamber in the bolt enters the said ports 19, flows around the groove 20 and so reaches the outlet port 12 in the ear, thus supplying the leaves of the spring with the oil or lubricant, it being evident that with the rising and falling motions of the left hand end of the spring, the ear may rotate freely on the bushing and the latter on the bolt, and vice versa, causing the greatest freedom of motion, ease and less friction in such rotations, while preserving the means of supply of oil or lubricant from the bolt to the ear, and consequently to the leaves between which it is adapted to be distributed, as has been stated.

Having thus described my invention what I claim as new and desire to secure by Letters Patent, is:—

1. In a spring adapted to have its leaves lubricated, a member of said leaves having on a terminal thereof an attaching ear, a bolt in said ear for supporting the spring, said bolt having a lubricant receiving chamber therein, a lubricant supply cup on said bolt at an angle to the length of the latter and in communication with said chamber, and a freely rotatable bushing interposed between said bolt and ear, there being communicating ducts in said ear, bushing, and bolt whereby the lubricant is directed through said bolt from the chamber therein and through said bushing and ear to the said leaves.

2. A vehicle spring comprising a series of contiguous bowed leaves having ducts upon their upper faces with the duct of one leaf communicating with the duct of the adjoining leaf, a member of said leaves having attaching ears on its terminals, bolts in said ears, said bolts having an annular groove and longitudinal grooves communicating therewith and with a duct communicating with the bore of the bolt and a loose bushing encircling one of said bolts and having a circumferential groove and ports communicating therewith.

JOHN C. DOWD.

Witnesses:
JOHN A. WIEDERSHEIM,
N. BUSSINGER.